(12) United States Patent
Lauw et al.

(10) Patent No.: US 7,666,255 B2
(45) Date of Patent: Feb. 23, 2010

(54) INK-JET INKS HAVING SURFACTANTS BELOW THE CRITICAL MICELLE CONCENTRATION AND ASSOCIATED METHODS

(75) Inventors: Hiang P Lauw, Corvallis, OR (US); Tye Dodge, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 684 days.

(21) Appl. No.: 11/076,223

(22) Filed: Mar. 9, 2005

(65) Prior Publication Data
US 2006/0203057 A1   Sep. 14, 2006

(51) Int. Cl.
C09D 11/02 (2006.01)
(52) U.S. Cl. .................. 106/31.59; 106/31.89
(58) Field of Classification Search ............. 106/31.59, 106/31.89
See application file for complete search history.

(56) References Cited

U.S. PATENT DOCUMENTS

| | | | |
|---|---|---|---|
| 5,133,803 A | 7/1992 | Moffatt | |
| 5,536,306 A | 7/1996 | Johnson et al. | |
| 5,626,655 A | 5/1997 | Pawlowski et al. | |
| 5,650,807 A | 7/1997 | Abe et al. | |
| 5,690,721 A | 11/1997 | Itoh | |
| 5,769,930 A | 6/1998 | Sano et al. | |
| 5,785,745 A | 7/1998 | Lauw et al. | |
| 5,788,754 A | 8/1998 | Deardurff et al. | |
| 5,833,744 A | 11/1998 | Breton et al. | |
| 5,935,309 A | 8/1999 | Moffatt et al. | |
| 5,988,807 A | 11/1999 | Bernard et al. | |
| 6,164,772 A | 12/2000 | Koitabashi et al. | |
| 6,174,354 B1 | 1/2001 | Takizawa et al. | |
| 6,176,911 B1 | 1/2001 | Schwarz | |
| 6,471,348 B1 | 10/2002 | Koitabashi | |
| 6,478,418 B2 | 11/2002 | Roboa et al. | |
| 6,612,691 B1 | 9/2003 | Koitabashi et al. | |
| 6,740,689 B1 | 5/2004 | Lee et al. | |
| 6,818,684 B2 | 11/2004 | Stone | |
| 2004/0059020 A1 | 3/2004 | Kamoto et al. | |
| 2004/0232262 A1 | 11/2004 | Itoh et al. | |

FOREIGN PATENT DOCUMENTS

| | | |
|---|---|---|
| EP | 1 350 821 A | 10/2003 |
| JP | 56 049771 A | 5/1981 |
| WO | WO 2004/046265 | 6/2004 |
| WO | WO 2005/007761 A | 1/2005 |

*Primary Examiner*—Jerry Lorengo
*Assistant Examiner*—Veronica Faison Gee

(57) ABSTRACT

Compositions and methods for ink-jet printing having increased slewing decap time and reduced clogging are disclosed and described. An ink-jet ink composition can include a colorant and a liquid vehicle having a surfactant. The surfactant can have a critical micelle concentration with respect to the ink-jet ink composition. In addition, the surfactant can be present in the ink-jet ink composition at a concentration from about 0.4 to about 0.95 times the critical micelle concentration. Further, the surfactant can also have an aromatic-containing portion. Using the ink-jet inks of the present invention during printing can allow for reduced clogging and increased stewing decap time during ink-jet printing on a variety of substrates with improved reliability, faster printing, and more efficient use of the ink.

41 Claims, No Drawings

INK-JET INKS HAVING SURFACTANTS BELOW THE CRITICAL MICELLE CONCENTRATION AND ASSOCIATED METHODS

FIELD OF THE INVENTION

The present invention relates generally to ink-jet ink compositions. More particularly, the present invention relates to reducing clogging and increasing decap time without a reduction in print quality.

BACKGROUND OF THE INVENTION

Commercially available printer technology for use by everyday consumers has evolved to a point where very high-resolution images can be transferred to various types of media, including paper. Ink-jet printing is a very popular and effective process for achieving high quality images, high speed, and affordable results. Ink-jet printing involves the placement of small drops of a fluid ink onto a media surface in response to a digital signal. Typically, the fluid ink is placed or jetted onto the surface without physical contact between the printing device and the surface. Within this general technique, the specific method used to deposit the ink-jet ink onto the printing surface varies from system to system, and can include continuous ink deposit and drop-on-demand ink deposit. Regarding drop-on-demand printing systems, the ink-jet inks are typically based upon water and solvents such as glycols. Essentially, with these systems, ink droplets are propelled from a nozzle by heat or by a pressure wave such that substantially all of the ink droplets ejected are used to form the printed image.

In general, ink-jet inks are either dye- or pigment-based inks. Both are typically prepared in an ink vehicle that contains the dye and/or the pigment. Dye-based ink-jet inks generally use a soluble colorant that is usually water-based. Conversely, pigmented inks typically use an insoluble or dispersed colorant to achieve color.

There are several reasons that ink-jet printing has become a popular way of recording images on various media surfaces, particularly paper. Some of these reasons include low printer noise, capability of high-speed recording, and multi-color recording. Additionally, these advantages can be obtained at a relatively low price to consumers.

Such improvements, while tremendously positive, have sparked increased demands by consumers in this area, e.g., higher speeds, higher resolution, full color image formation, increased stability, etc. As new ink-jet inks are developed, there have been several traditional characteristics to consider when evaluating the ink in conjunction with a printing surface or substrate. Such characteristics include edge acuity and optical density of the image on the surface, uniformity of optical density and color in printed regions, black to color bleed control, dry time of the ink on the substrate, adhesion to the substrate, lack of deviation in ink droplet placement, presence of all dots, resistance of the ink after drying to water and other solvents, long term storage stability, long term reliability without corrosion or nozzle clogging, and short term latency during printing.

Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements.

Furthermore, dye-based ink-jet inks tend to have edge acuity and accuracy of droplet placement that are generally inferior to pigment-based ink-jet inks. Thus, there has been increased interest in improving print quality resulting from the use of dye-based ink-jet inks. One characteristic of many ink-jet inks is the tendency of the ink to dry and/or partially agglomerate to form obstructions at the exit of the nozzles. More specifically, during ink-jet printing, a plurality of nozzles, e.g., 48 to 320 are used with each nozzle experiencing periods of non-use while also being exposed to the air. This period of non-use during printing can often allow the more volatile components of the ink to evaporate and thus produce solids which can block the nozzle or cause redirection of the ink droplets.

Most ink-jet printing systems include a mechanism which allows for servicing of the nozzles to remove material which tends to block the nozzles. However, these service operations entail increased time to perform and can reduce the useful life of the print mechanisms. For example, to avoid the problems associated with decap, pens can be fired periodically at times other than when printing on a desired substrate, resulting in wasted ink-jet ink. Thus, increasing slewing decap time can reduce waste of ink-jet ink and reduce wear on the printer. One method of increasing slewing decap time can involve increasing the kinetic energy of the drop ejected from the pen. However, increasing kinetic energy can also increase the spray, drop weight, and/or other image quality degrading characteristics. Other approaches have also been attempted with varying degrees of success.

Accordingly, investigations continue into developing ink formulations that have improved properties and that do not improve one property at the significant expense of the others. Many challenges still remain to further improve the image quality and stability of ink-jet inks without sacrificing pen performance and reliability.

SUMMARY OF THE INVENTION

It has been recognized that it would be advantageous to develop ink compositions which have both improved slewing decap times and high print quality suitable for use in ink-jet printing.

In accordance with one aspect of the present invention, an ink-jet ink composition can include a colorant and a liquid vehicle having a surfactant. The surfactant can have a critical micelle concentration with respect to the ink-jet ink composition. In addition, the surfactant can be present in the ink-jet ink composition at a concentration from about 0.4 to about 0.95 times the critical micelle concentration. Further, the surfactant can also have an aromatic-containing portion. Using the ink-jet inks of the present invention during printing can allow for reduced clogging and increased stewing decap time during ink-jet printing on a variety of substrates.

Additional features and advantages of the invention will be apparent from the detailed description which illustrates, by way of example, features of the invention.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a dye" includes reference to one or more of such materials.

As used herein, "colorant" refers to any material which imparts a visible color to an ink-jet ink composition when printed on a substrate. Typical colorants can include dyes, pigments, and the like.

As used herein, "dye" refers to a colorant molecule which is substantially soluble in the liquid vehicle in which it is used.

As used herein, "vehicle" is defined to include liquid compositions that can be used to carry colorants to a substrate. Liquid vehicles are well known in the art, and a wide variety of ink vehicles may be used in accordance with embodiments of the present invention. Such ink vehicles may include a mixture of a variety of different agents, including without limitation, surfactants, organic solvents and co-solvents, buffers, biocides, viscosity modifiers, sequestering agents, stabilizing agents, anti-kogation agents, and water. Though not part of the liquid vehicle per se, in addition to the colorants, the liquid vehicle can carry solid additives such as polymers, latexes, UV curable materials, plasticizers, salts, etc.

As used herein, "critical micelle concentration" or "CMC" refers to the concentration of a surfactant at which additional surfactant substantially all forms micelles. Typically, there is a relatively small range of concentrations separating the limit below which substantially no micelles are detected and the limit above which substantially all additional surfactant molecules form micelles. Many properties of surfactant solutions, if plotted against the concentration, appear to change at a different rate above and below this range. By extrapolating the loci of such a property above and below this range until they intersect, a value can be obtained known as the critical micellization concentration or critical micelle concentration (CMC). The CMC value can also be viewed as the concentration at which surface tension stabilizes. Further, the CMC value for a surfactant can depend on the liquid vehicle and components of the ink composition. Thus, the CMC value of a surfactant in an ink composition can vary from that typically found in pure water. Generally, the CMC value in a predominantly aqueous ink will only vary a very small amount from the CMC in water. Further, CMC values are based on weight percent unless otherwise noted.

As used herein, "equilibrated film" refers to a film of substantially oriented surfactant molecules at an air-liquid interface which has a substantially constant concentration of surfactant molecules therein. Typically, an equilibrated film of surfactant molecules will include surfactant molecules having their hydrophobic ends toward the air, often at least partially above the surface, and the hydrophilic end oriented in the liquid. This discussion is primarily based on the premise that the inks of the present invention are dominantly all aqueous inks.

As used herein, "slewing decap time" is the time during which a nozzle is exposed between ejection of an ink droplet. Specifically, during printing the nozzles are uncovered but are generally used intermittently with periods of non-use extending from a fraction of a second up to about 25 seconds. Therefore, slewing decap time refers to the time during use of a printhead between firings. Typically, average maximum slewing decap time can range from about 5 seconds to about 25 seconds, although times outside this range can occur, depending on the particular image being formed.

The term "off-axis printer" refers to printers that generally include printhead apparatuses that are integrated as part of the printer, rather than as part of the ink supply. As such, off-axis printers typically allow for the replacement of ink cartridges without also replacing the printhead. Because a printhead of an off-axis printer is typically not changed over the life of the printer, even upon changing ink supplies on multiple occasions, there is a need to provide inks that do not clog the printhead nozzles.

As used herein with respect to an identified property or circumstance, "substantially" refers to a degree of deviation that is sufficiently small so as to not measurably detract from the identified property or circumstance. The exact degree of deviation allowable may in some cases depend on the specific context. Of course, other properties can vary considerably. For example, an ink composition which is substantially free of additional surfactants can have additional surfactant at concentrations which are considered trace amounts or less than about 0.0001 wt %, depending on the particular ink formulation.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1% to about 20% should be interpreted to include not only the explicitly recited concentration limits of 1% to about 20%, but also to include individual concentrations such as 2%, 3%, 4%, and sub-ranges such as 5% to 15%, 10% to 20%, etc.

In accordance with the present invention, an ink-jet ink composition can include a colorant and a liquid vehicle including a surfactant. The surfactant can have a critical micelle concentration (CMC) with respect to the ink-jet ink composition and the surfactant can be present in the ink-jet ink composition at a concentration from about 0.4 to about 0.95 times the CMC. Surfactants which are useful in connection with the present invention can also have an aromatic-containing portion. Thus, in one aspect, decreased clogging can be achieved through a mechanism which involves a balance of relatively low concentrations of surfactant with specific types of surfactants.

More specifically, the surfactant can be present in the ink-jet ink composition at a concentration which is about 0.4 to about 0.95 times the critical micelle concentration. Depending on the particular formulation and surfactant, one particularly effective range of concentrations can be from about 0.7 to about 0.95 times the critical micelle concentration. In some of these formulations, concentrations above about 0.90 to 0.95 begin to exhibit decreased performance such as increased wicking. Similarly, concentrations below about 0.4 tend to have insufficient surfactant content to affect a reduction in clogging. Typically, the degree of wicking noted at these embodiments would not be considered problematic. However, the compositions and methods of the present invention are intended to significantly improve the standard of acceptable wicking and bleed, especially in the case of high quality text printing. In yet another aspect of the present invention, exceptionally low concentrations of surfactant can result in improved ink properties. For example, the surfactant can alternatively be present at from about 0.5 to about 0.7 times the critical micelle concentration. With respect to SOL-SPERSE 27000, the concentration can range from about 0.45 to about 0.75 times the critical micelle concentration with good results.

Though surfactants have been added to many ink-jet inks for many different purposes, and though surfactants are typically described as being added over a relatively broad range of amounts, e.g., from trace amounts to 10 wt % or more, the addition of surfactants is typically done at concentrations which exceed the critical micelle concentration. By adding too much surfactant to an ink-jet ink composition, this can lead to a decrease in edge acuity of printed images. Primarily, this loss in print quality is due to wicking of the ink on the substrate immediately subsequent to printing. This loss of edge acuity is particularly problematic when printing high quality text or when printing images with a high contrast, e.g., black on white background, black adjacent to yellow, etc. In accordance with embodiments of the present invention, by carefully selecting an amount of surfactant to add that is within a relatively narrow range below the CMC, the benefits of added surfactant with respect to increased slewing decap time and reduced clogging can be achieved without contributing to these drawbacks.

The surfactants for use in accordance with embodiments of the present invention can comprise an aromatic-containing portion which can include a member selected from the group consisting of phenyl, benzyl, napthyl, substituted members thereof, and combinations thereof. Surfactants suitable for use in the present invention can most often have an aromatic-containing portion which is a phenyl group. In one aspect, the aromatic-containing portion of the surfactant can be directly attached to or part of the hydrophilic moiety.

In accordance with an aspect of the present invention, the surfactant can be chosen from among several classes of surfactants. Suitable surfactants can be, but are in no way limited to, aromatic polyalkoxylates, aromatic polyethylene glycols, linear alkylbenzene sulphonates, alkylphenol polyethoxylates, aromatic secondary alcohol ethoxylates, diphenyl sulfonate derivatives, aromatic alkyl polyethylene oxides, alkyl phenyl polyethylene oxides, aromatic polyethylene oxide block copolymers, fluorinated derivatives of these surfactants, and combinations thereof. In one specific aspect of the present invention, the surfactant can be an aromatic polymeric ethoxylate. Examples of several commercially available surfactants which are suitable in the present invention can include aromatic ethoxylates such as SOLSPERSE series surfactants including SOLSPERSE 27000, nonionic polyoxyethylene nonyl phenols such as IGEPAL CO-210 (4-$(C_9H_{19})C_6H_4(OCH_2CH_2)_nOH$, n~2), IGEPAL CO-520 (4-$(C_9H_{19})C_6H_4(OCH_2CH_2)_nOH$, n~5), and IGEPAL CO-720 (4-$(C_9H_{19})C_6H_4(OCH_2CH_2)_nOH$, n~12), MERPOL, TERGITOL, and alkyl phenyl polyethylene oxides such as TRITON X-100 (a nonionic octyl phenol ethoxylate having the chemical structure shown in Formula I).

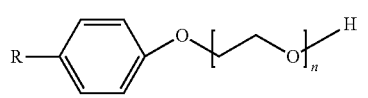
(I)

where R is n-octyl and n is 9.5 on average. Surfactants such as aromatic polyethoxylates of the SOLSPERSE and IGEPAL can provide good results in connection with the present invention.

Bleed control and edge acuity can be at least partially balanced and controlled by including an appropriate surfactant as discussed herein. In this way, the surfactant can increase the rate at which the inks penetrate vertically into a substrate rather than spread out horizontally across a substrate surface. Thus, the use of surfactants in this manner can involve a careful balance of several factors such as penetration into the substrate and clogging versus loss of edge acuity and ink viscosity.

The specific amount of surfactant added in accordance with the present invention will depend largely on the CMC value of the particular surfactant. However, as a general guideline, the concentration of surfactant can range from about 0.01 wt % to about 1 wt %, depending on the surfactant and the specific ink that its CMC is compared to. For example, for polyethoxy surfactants, a longer polyethoxy tail can result in higher CMC values.

Without being bound by a particular theory, it is thought that one influential factor of the present invention is choosing a surfactant which can have a diffusion coefficient in the ink-jet ink composition which effects surfactant behavior at an air-liquid interface of the ink composition. More specifically, the surfactant can be chosen such that diffusion of surfactant molecules to an air-liquid interface forms a substantially equilibrated film in less than about 1 second. The equilibrated film can act to form a barrier which reduces the rate of evaporation of solvent and other volatile components in the ink composition. Thus, it can be that individual surfactant molecules can relatively rapidly migrate toward the air-liquid interface during the slewing decap time.

In addition to the CMC value and type of surfactant, the molecular weight of the surfactant can influence the ability of these surfactants to achieve both reduced clogging and improved print quality. In one aspect of the present invention, the surfactant can have a molecular weight from about 200 g/mol to about 50000 g/mol. In one more detailed aspect, the surfactant can have a molecular weight from about 10000 g/mol to about 35000 g/mol. In yet another detailed aspect of the present invention, the surfactant can have a molecular weight from about 200 g/mol to about 1500 g/mol. These lower molecular weight surfactants can be typical of surfactants such as the IGEPAL and TRITON series surfactants, while the higher molecular weight surfactants can include some of the SOLSPERSE surfactants, for example.

In still another aspect of the present invention, the surfactant can be a non-ionic surfactant. However, ionic and amphoteric surfactants can also be useful in some embodiments.

In accordance with the present invention, the ink-jet ink composition can include a single surfactant. Alternatively, the ink-jet ink composition can include a plurality of surfactants. However, in such cases, each surfactant will have a corresponding critical micelle concentration in the ink-jet ink composition. Thus, in accordance with the present invention, each surfactant can be individually present in the ink-jet ink composition at a concentration which is within the low concentration discussed above for the first surfactant, e.g., from about 0.4 to about 0.95 times the corresponding critical micelle concentration. Typically, a combination of surfactants will have a non-additive affect on the CMC value, i.e. each surfactant can have a greater or lesser contribution to the overall CMC value than other surfactants.

As mentioned elsewhere, the ink-jet ink compositions can unexpectedly benefit from surfactants in very low concentrations. Thus, in many embodiments the composition can be substantially free of dispersants and additional surfactants other than a single surfactant within the mentioned ranges below the CMC.

Although not absolutely required, most of the contemplated ink compositions are aqueous compositions which are predominantly water by weight, i.e. greater than 50%. In one detailed aspect of the present invention, the ink-jet ink composition can comprise more than 60 wt % water. Thus, the CMC of the surfactant in the ink composition will generally be very close to the CMC of the surfactant in water, depending on the surfactant and ink vehicle.

The colorant used in the present invention can be any color suitable for a particular application. Either dyes or pigments can be used in connection with the present invention. However, a more measurable improvement in performance is found when utilizing dye colorants. Typical colors used in commercial products include black, magenta, cyan, and yellow.

Examples of black pigments that can be used include carbon pigments. The carbon pigment can be almost any commercially available carbon pigment that provides acceptable optical density and print characteristics. Carbon pigments suitable for use in the present invention include, without limitation, carbon black, graphite, vitreous carbon, charcoal, and combinations thereof. Such carbon pigments are commercially available from such vendors as Cabot Corporation, Columbian Chemicals Company, Degussa A G, and E. I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, and CAB-O-JET 300; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V; and TIPURE R-101 available from Dupont. The above list of pigments includes unmodified pigment particulates, small molecule attached pigment particulates, and polymer-dispersed pigment particulates.

Similarly, a wide variety of colored pigments can be used with the present invention, therefore the following listing is not intended to be limiting. The following color pigments are available from Cabot Corp.: CABO-JET 250C, CABO-JET 260M, and CABO-JET 270Y. The following color pigments are available from BASF Corp.: PALIOGEN Orange, HELIOGEN Blue L 6901 F, HELIOGEN Blue NBD 7010, HELIOGEN Blue K 7090, HELIOGEN Blue L 7101 F, PALIOGEN Blue L 6470, HELIOGEN Green K 8683, and HELIOGEN Green L 9140. The following pigments are available from Ciba-Geigy Corp.: CHROMOPHTAL Yellow 3G, CHROMOPHTAL Yellow GR, CHROMOPHTAL Yellow 8G, IGRAZIN Yellow 5GT, IGRALITE Rubine 4BL, MONASTRAL Magenta, MONASTRAL Scarlet, MONASTRAL Violet R, MONASTRAL Red B, and MONASTRAL Violet Maroon B. The following pigments are available from Heubach Group: DALAMAR Yellow YT-858-D and HEUCOPHTHAL Blue G XBT-583D. The following pigments are available from Hoechst Specialty Chemicals: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM Yellow HR, NOVOPERM Yellow FGL, Hansa Brilliant Yellow 10GX, Permanent Yellow G3R-01, HOSTAPERM Yellow H4G, HOSTAPERM Yellow H3G, Hostaperme Orange GR, HOSTAPERM Scarlet GO, and Permanent Rubine F6B. The following pigments are available from Mobay Corp.: QUINDO Magenta, INDOFAST Brilliant Scarlet, QUINDO Red R6700, QUINDO Red R6713, and INDOFAST Violet. The following pigments are available from Sun Chemical Corp.: L74-1357 Yellow, L75-1331 Yellow, and L75-2577 Yellow. Suitable inorganic pigments include, for example, titanium oxide, cobalt blue (CoO—$Al_2O_3$), chrome yellow ($PbCrO_4$), and iron oxide. Suitable organic pigments includes, for example, azo pigments, polycyclic pigments (e.g., phthalocyanine pigments, perylene pigments, perynone pigments, anthraquinone pigments, quinacridone pigments, dioxazine pigments, thioindigo pigments, isoindolinone pigments and quinophthalone pigments), dye chelates (e.g., basic dye type chelates and acidic dye type chelate), nitropigments, nitroso pigments, and the like.

As mentioned above, ink-jet ink compositions which contain a dye colorant can particularly benefit from the principles of the present invention. Suitable dyes for use in the present invention include, without limitation, anionic water-soluble dyes and their ions, and any other known dyes. Non-limiting examples of suitable dyes include phthalocyanine dyes, azo dyes, anthraquinone dyes, xanthene dyes, indigoid dyes, polymethine dyes, metallized dyes, and other photo dyes. With respect to the colorants that can be used, the present invention is particularly adapted for use with black dye-based ink-jet inks, though color dyes can also be used.

The reason that black dye-based inks are particularly useful is because black dye-based inks are often used to print text on plain paper. As consumers are accustomed to laser quality text, in order for a dye-based ink-jet ink to compete favorably with laser technology, very crisp images are desirable. The low amount of surfactant used in accordance with embodiments of the present invention can facilitate very crisp images, even on plain paper, while retaining the benefit of increased stewing decap time and reduced printhead orifice clogging. This being stated, these inks are also acceptable for use on photo and other media, such as inorganic pigment-coated porous media, e.g., silica- or alumina-based media coatings, and organic swellable media, both of which are commonly used for photo printing applications.

Examples of suitable dyes include a large number of water-soluble acid and direct dyes. Specific examples of dyes include, but are not limited to, the Pro-Jet series of dyes available from ICI, Aminyl Brilliant Red F-B (Sumitomo Chemical Co.); the Duasyn line of "salt-free" dyes available from Hoechst; and the like. Further examples include Tricon Acid Red 52, Tricon Direct Red 227, and Tricon-Acid Yellow 17 (Tricon Colors Incorporated), Bernacid Red 2BMN, Pontamine Brilliant Bond Blue A, BASF X-34, Pontamine, Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Catodirect Yellow RL (Direct Yellow 86, Carolina Color and Chemical), Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; Yellow PJY H-3RNA; Aminyl Brilliant Red F-B (Sumitomo Chemical Co.);, Reactive Black 31, Direct Yellow 157, Reactive Yellow 37, Acid Yellow 23, Reactive Red 180, Acid Red 52, Acid Blue 9, Direct Yellow 86, Acid Red 249, Direct Blue 199, Direct Black 168, Direct Yellow 132, Food Black 2, Direct Blue 86, Reactive Red 4, Reactive Red 56, Direct Red 9, Direct Red 254, Magenta 377, Yellow 104, Direct Yellow 4, Direct Yellow 50, carboxylated Food Black 286, carboxylated Food Black 287, Acid Orange 7, mixtures thereof, and the like.

In one detailed aspect of the present invention, the colorant can be a black dye having the following general structure shown in Formula II.

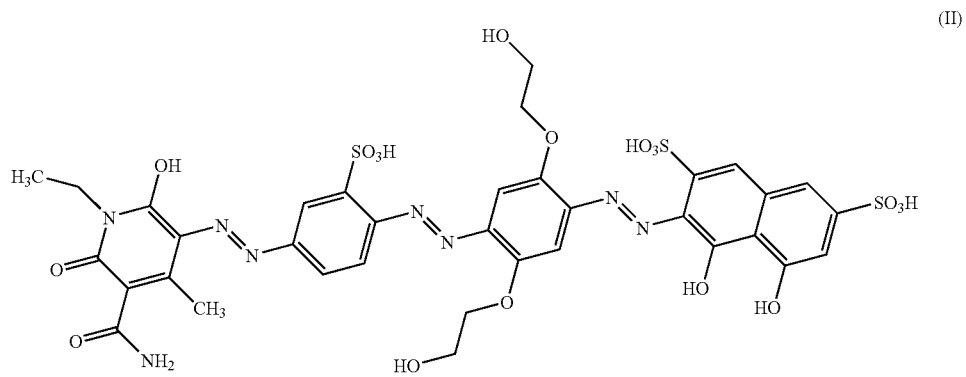

(II)

In another detailed aspect, the colorant can be a black dye having the structure shown in Formula III.

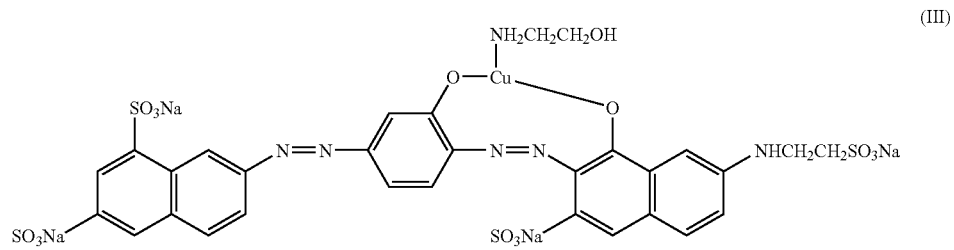

(III)

Any dye used can be of a particular color or black, depending on the application or desired use. Although the above lists of colored pigments and dyes are provided, they are in no way intended to be limiting of the present invention and it will be understood that other known pigments and/or dyes can be used in conjunction with the ink-jet inks of the present invention. Further, the above-illustrated colorants can be used singly or in combination of two or more colorants. As is well known in the art, typical pigments can comprise from about 1 wt % to about 25 wt %, and often from 2 wt % to 10 wt %, of the ink-jet ink composition. Typical dyes can comprise from about 0.1 wt % to about 15 wt %, and often from about 1 wt % to 8 wt %, of the ink-jet ink composition.

In an optional embodiment of the present invention, a bleed control agent can be included to reduce bleed when printing colors adjacent one another. Almost any known reactive bleed control agent and/or mechanism can be used. Suitable bleed control mechanisms can include, but are in no way limited to, reactive salts, pH differentials, solvents, polymers, cationic-anionic systems, and combinations of these mechanisms. Typically, these mechanisms can control bleed by precipitating the pigment or otherwise creating a physical barrier to ink flow where the two inks contact one another.

A variety of liquid vehicles can be used in the present invention. Typically, water can be used as the primary liquid vehicle; however, other liquids can also be used such as standard solvents and/or co-solvents as described herein. Typically, the ink-jet ink compositions of the present invention have a viscosity of between about 0.8 to about 8 cps, although this can vary depending on the specific ink-jet architecture used. For example, piezoelectric ink-jet architecture is capable of reliably ink-jetting much more viscous materials than thermal ink-jet architecture. In one aspect of the present invention, the ink vehicle can comprise from about 50% to about 98% by weight of the ink-jet ink composition.

Further, the ink-jet ink compositions of the present invention can include additional components. For example, binders, latexes, UV curable materials, plasticizers, salts, buffers, biocides, solvents, co-solvents, viscosity modifiers, sequestering agents, stabilizing agents, anti-kogation agents, humectants, and/or other known additives can be included in the liquid vehicle or ink-jet ink composition. Those skilled in the art can choose and design specific ink-jet ink formulations to affect dry time, e.g., surfactant content, ink vehicle, co-solvents, etc., and a variety of other considerations which are important and unique to ink-jet inks.

Classes of co-solvents that can be used include water soluble organic solvents such as, but not limited to, aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, lactams, unsubstituted caprolactams, both substituted and unsubstituted formamides, both substituted and unsubstituted acetamides, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, ketones, and the like. Specific examples of common co-solvents that can be used include trimethylolpropane, 2-pyrrolidinone, 1,5-pentanediol, 2-ethyl-2-hydroxymethyl-1,3-propanediol, diethylene glycol, 3-methoxybutanol, and 1,3-dimethyl-2-imidazolidinone. Co-solvents can be added to reduce the rate of evaporation of water in the ink-jet ink to minimize clogging or other properties of the ink such as viscosity, pH, surface tension, optical density, and print quality. The total co-solvent concentration can range from about 0 wt % to about 40 wt %. However, care should be taken so as to not adversely affect the print quality.

In an additional aspect of the present invention, binders can be included which act to secure the colorants on the substrate. Binders suitable for use in the present invention typically have a molecular weight from about 100 Mw to about 50,000 Mw. Non-limiting examples of binders include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof.

Consistent with the formulation of this invention, various other additives may be employed to optimize the properties of the ink composition for specific applications. Examples of these additives are those added to inhibit the growth of harmful microorganisms during long-term storage or disuse. These additives may be biocides, fungicides, and other anti-microbial agents, which are routinely used in ink formulations. Several non-limiting examples of suitable biocides include benzoate salts, sorbate salts, commercial products such as NUOSEPT, UCARCIDE, VANCIDE and PROXEL, and other known biocides. Typically, such biocides comprise less than about 5 wt % of the ink-jet ink composition and often from about 0.1 wt % to about 0.25 wt %.

Sequestering agents, such as EDTA, may be included to eliminate the deleterious effects of metal impurities. Such sequestering agents typically comprise from 0 wt % to 2 wt % of the ink-jet ink compositions. Viscosity modifiers may also be present, as well as other additives known to those skilled in the art to modify properties of the ink as desired. Such additives can be present in the ink-jet ink compositions at from 0 wt % to 20 wt %.

Various buffering agents or pH adjusting agents can also be optionally used in the ink-jet ink compositions of the present invention. Typical pH adjusting agents include such pH control solutions as hydroxides of alkali metals and amines, such as lithium hydroxide, sodium hydroxide, potassium hydroxide; citric acid; amines such as triethanolamine, diethanolamine, and dimethyl-ethanolamine; hydrochloric acid; and other basic or acidic components which do not substantially interfere with the bleed control characteristics of the present invention. If used, pH adjusting agents typically comprise less than about 10 wt % of the ink-jet ink composition. Similarly, buffering agents can be used such as, but not limited to, TRIS, MOPS, citric acid, acetic acid, MES, etc., which will try to maintain the pH at some value depending on the agents pKa.) If used, buffering agents typically comprise less than about 3 wt % of the ink-jet ink composition and generally from about 0 wt % to 2 wt %, most commonly from 0.2 wt % to 0.5 wt %.

Once the desired ink-jet ink compositions are prepared, they can be placed into one or more ink-jet pens as is well known in the art. A system for printing images on a substrate in accordance with the present invention can include multiple firing chambers containing multiple ink-jet ink compositions, respectively. For example, the ink-jet ink compositions of the present invention can be placed within separate reservoirs. The separate reservoirs can be housed within a single or multiple cartridges. Each reservoir can also be operatively connected to a firing chamber. In one aspect of the present invention, the operative connection between the firing chamber and the reservoir is an elongated tube that separates a replaceable ink cartridge from a more permanently attached printhead. This type of configuration is often referred to as an off-axis printer, and the inks of the present invention are acceptable for use even in these types of printer systems.

Further, it is often desirable to provide ink sets having multiple colors for producing a variety of images such as full color images. The additional ink-jet inks can include colorants such as dye colorants, pigments colorants, and combinations thereof. In some cases, the additional ink-jet inks can include dye colorants. Often additional inks can be prepared to form three, four, five, six, or more inks in a set to offer additional advantages known to those skilled in the art.

The ink-jet ink pens can be configured for use in either thermal or piezoelectric ink-jet architecture. In one specific embodiment, the ink-jet ink composition can be ink-jettable from a thermal ink-jet printhead.

Thus, in accordance with yet another aspect of the present invention, a method for producing ink-jet ink cartridges which offer reduced clogging and increased slewing decap time during ink-jet printing can be realized. An ink-jet ink composition can be prepared as described above. The ink-jet ink composition can then be placed in an ink-jet cartridge.

The ink-jet cartridge can then be used to print high quality images using an ink-jet printer. Currently preferred ink-jet printers are those offered by Hewlett-Packard Company. Regardless, the ink-jet cartridge having an ink-jet ink composition therein can be placed, or comes placed, in an ink-jet printer such as a thermal ink-jet printer. The ink-jet ink composition can then be printed on a substrate.

As a result of the ink-jet ink compositions of the present invention, the slewing decap time can be from about 5 seconds to about 25 seconds without decreased reliability and print quality problems. In some embodiments, the slewing decap time can range from about 8 seconds to about 25 seconds without clogging or redirection of droplets. Typically, the slewing decap time can be greater than 5 seconds. In accordance with the present invention, the increased slewing decap time can be about 40% greater than an otherwise identical ink-jet ink prepared without the presence of said surfactant. However, as a general matter, the increased slewing decap time can range from about 10% to about 60%. Thus, reduced clogging can allow for improvements in the length of time the nozzle can be expected to remain useful without the assistance of servicing or non-imaging spitting. This directly translates into faster printing and more efficient use of the ink, as well as a longer lasting printhead.

In addition to reducing clogging over extended slewing decap times, and reducing the degree of feathering or wicking at edges of printed images, the present invention can also result in a reduction in mottle. Thus, the printed compositions tend to immobilize the colorant such that it is not effected as much by non-uniform wicking (speeds for different directions and locations) of the substrate which results in mottle. Images produced in accordance with the principles of the present invention can exhibit increased reliability, reduced clogging, increased edge acuity, as well as minimal mottle.

The ink-jet inks of the present invention can be printed on almost any standard media substrate. Typical substrates can include, but are not limited to, paper, polymeric film, silicon wafers, ceramic, metal, biological substrates, coated forms of the aforementioned substrates, and composites thereof. Typically, the substrate used with the ink sets of the present invention can be paper. Suitable papers can be standard printing paper, laminated paper, photo-paper, and the like.

EXAMPLE

The following example illustrates an embodiment of the invention that is presently best known. However, it is to be understood that the following is only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Example provides further detail in connection with what is presently deemed to be a practical embodiment of the invention.

An ink-jet ink composition in accordance with the present invention can be produced using components within the ranges shown in Table 1. In one embodiment, the components can be combined to form a black ink.

TABLE 1

| Component | Amount |
|---|---|
| 1-(2-hydroxyethyl)-2-pyrrolidinone | 5-15 wt % |
| 2-pyrrolidinone | 8 wt % |
| SOLSPERSE 27000 surfactant | 0.25 wt % |
| Li-Phosphate | 0.1 wt % |
| EDTA - disodium salt | 0.1 wt % |
| MOPS - free acid | 0.2 wt % |
| Proxel GXL | 0.1 wt % |
| Formula II Dye | 2-5 wt % |
| Target pH | 7-7.5 |

The concentration of SOLSPERSE 27000 corresponded to about 0.5 times the CMC value of the SOLSPERSE in the ink-jet ink composition (about 0.5 wt %). The black ink was then ink-jetted from an HP DeskJet printer. The print quality was exceptional and no clogging or misdirected droplets were noted.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. An ink-jet ink composition, comprising:
   a) a colorant, and
   b) a liquid vehicle including a surfactant, said surfactant having a critical micelle concentration with respect to the ink-jet ink composition, said surfactant being present in the ink-jet ink composition at a concentration from about 0.4 to about 0.95 times the critical micelle concentration, said surfactant also having an aromatic-containing portion; wherein the surfactant has a diffusion coefficient in the ink-jet ink composition such that diffusion of surfactant molecules to an air-liquid interface forms a substantially equilibrated film in less than about 1 second.

2. The composition of claim 1, wherein the surfactant is present at from about 0.7 to about 0.95 times the critical micelle concentration.

3. The composition of claim 1, wherein the surfactant is present at from about 0.5 to about 0.7 times the critical micelle concentration.

4. The composition of claim 1, wherein the surfactant is a member selected from the group consisting of aromatic polyalkoxylates, aromatic polyethylene glycols, linear alkylbenzene sulphonates, alkylphenol polyethoxylates, aromatic secondary alcohol ethoxylates, diphenyl sulfonate derivatives, aromatic alkyl polyethylene oxides, alkyl phenyl polyethylene oxides, aromatic polyethylene oxide block copolymers, fluorinated derivatives of these surfactants, and combinations thereof.

5. The composition of claim 4, wherein the surfactant is a polymeric ethoxylate.

6. The composition of claim 1, wherein the ink-jet ink composition is more than 60 wt % water.

7. The composition of claim 1, wherein the aromatic-containing portion includes a member selected from the group consisting of phenyl, benzyl, napthyl, substituted members thereof, and combinations thereof.

8. The composition of claim 7, wherein the aromatic-containing portion is phenyl.

9. The composition of claim 1, wherein the surfactant has a molecular weight from about 200 g/mol to about 50000 g/mol.

10. The composition of claim 9, wherein the surfactant has a molecular weight from about 10000 g/mol to about 35000 g/mol.

11. The composition of claim 9, wherein the surfactant has a molecular weight from about 200 g/mol to about 1500 g/mol.

12. The composition of claim 1, wherein the composition includes a single surfactant.

13. The composition of claim 12, wherein the composition is substantially free of dispersants and additional surfactants.

14. The composition of claim 1, wherein the composition includes a plurality of surfactants, each having a corresponding critical micelle concentration in the ink-jet ink composition, with the proviso that each surfactant is individually present in the ink-jet ink composition at a concentration from about 0.4 to about 0.95 times its corresponding critical micelle concentration.

15. The composition of claim 1, wherein the surfactant is a non-ionic surfactant.

16. The composition of claim 1, wherein the colorant is a dye.

17. The composition of claim 1, wherein the colorant is a black dye having the following general structure:

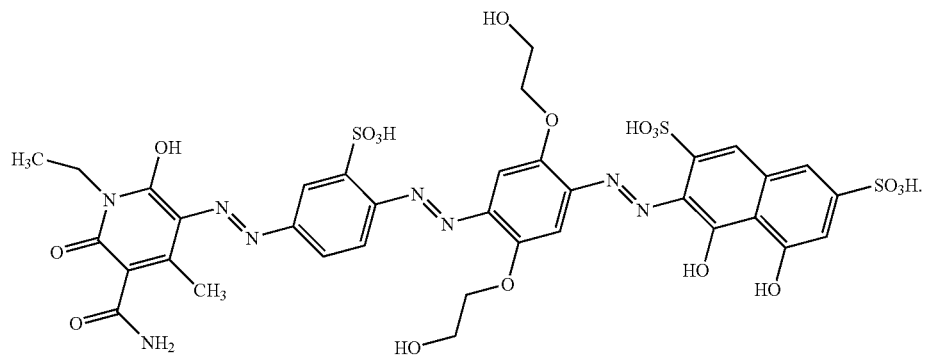

18. The composition of claim 1, wherein the colorant is a black dye having the following general structure:

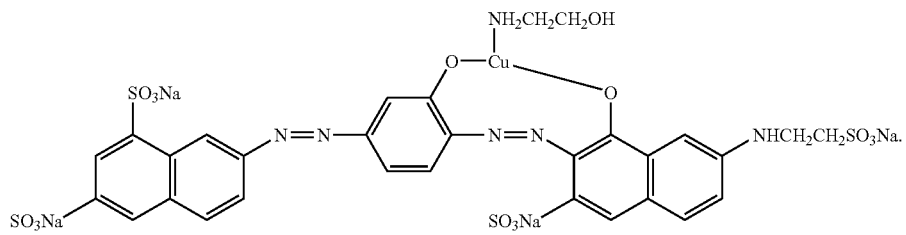

19. The composition of claim 1, wherein the ink-jet ink composition is ink-jettable from a thermal ink-jet printhead.

20. A method for producing ink-jet ink cartridges which offer reduced clogging and increased slewing decap time during ink-jet printing, comprising the steps of:
   a) preparing an ink-jet ink composition including a colorant and a liquid vehicle having a surfactant, said surfactant having a critical micelle concentration with respect to the ink-jet ink composition, said surfactant being present in the ink-jet ink composition at a concentration from about 0.4 to about 0.95 times the critical micelle concentration, said surfactant also having an aromatic-containing portion and a diffusion coefficient in the ink-jet ink composition such that diffusion of surfactant molecules to an air-liquid interface forms a substantially equilibrated film in less than about 1 second; and b) placing the ink-jet ink composition in an ink-jet cartridge.

21. The method of claim 20, wherein the surfactant is present at from about 0.7 to about 0.95 times the critical micelle concentration.

22. The method of claim 20, wherein the surfactant is a member selected from the group consisting of aromatic polyalkoxylates, aromatic polyethylene glycols, linear alkylbenzene sulphonates, alkylphenol polyethoxylates, aromatic secondary alcohol ethoxylates, diphenyl sulfonate derivatives, aromatic alkyl polyethylene oxides, alkyl phenyl polyethylene oxides, aromatic polyethylene oxide block copolymers, fluorinated derivatives of these surfactants, and combinations thereof.

23. The method of claim 20, wherein the aromatic portion is a member selected from the group consisting of phenyl, benzyl, napthyl, substituted members thereof, and combinations thereof.

24. The method of claim 20, wherein the composition is substantially free of dispersants and additional surfactants.

25. The method of claim 20, wherein the surfactant is a non-ionic surfactant.

26. The method of claim 20, wherein the colorant is a black dye having the following general structure:

32. A method of ink-jet printing with reduced clogging and increased slewing decap time, comprising the step of jetting an ink-jet ink composition from a printhead, said ink-jet ink composition including a colorant, a liquid vehicle, and a surfactant, said surfactant being present at a concentration which is from about 0.4 to about 0.95 times a critical micelle concentration of the surfactant in the ink composition and having an aromatic portion, and wherein the surfactant has a diffusion coefficient in the ink-jet ink composition such that diffusion of surfactant molecules to an air-liquid interface forms a substantially equilibrated film in less than about 1 second.

33. The method of claim 32, wherein the surfactant is present at from about 0.7 to about 0.95 times the critical micelle concentration.

34. The method of claim 32, wherein the surfactant is a member selected from the group consisting of aromatic polyalkoxylates, aromatic polyethylene glycols, linear alkylbenzene sulphonates, alkylphenol polyethoxylates, aromatic secondary alcohol ethoxylates, diphenyl sulfonate derivatives,

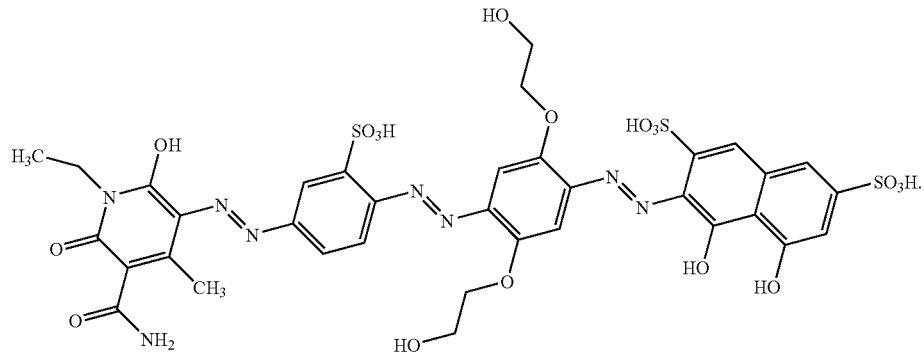

27. The method of claim 20, wherein the colorant is a black dye having the following general structure:

aromatic alkyl polyethylene oxides, alkyl phenyl polyethylene oxides, aromatic polyethylene oxide block copolymers,

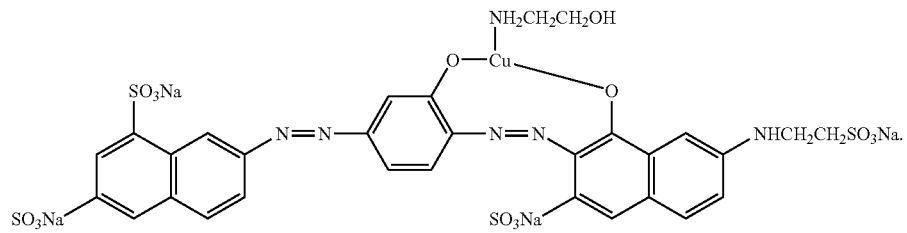

28. The method of claim 20, wherein the slewing decap time is from about 5 seconds to about 25 seconds.

29. The method of claim 20, wherein the ink-jet cartridge includes a thermal or piezoelectric driven orifice plate.

30. The method of claim 20, wherein the ink-jet cartridge is configured for use with an off-axis printer.

31. The method of claim 20, wherein the increased slewing decap time is at least 10% greater than an otherwise identical ink-jet ink prepared without the presence of said surfactant.

fluorinated derivatives of these surfactants, and combinations thereof.

35. The method of claim 32, wherein the aromatic portion is a member selected from the group consisting of phenyl, benzyl, napthyl, substituted members thereof, and combinations thereof.

36. The method of claim 32, wherein the slewing decap time is from about 5 seconds to about 25 seconds.

37. The method of claim 32, wherein the ink-jet cartridge includes a thermal or piezoelectric driven orifice plate.

38. The method of claim 32, wherein the printer is a thermal ink-jet printer.

39. The method of claim 32, wherein the substrate is a member selected from the group consisting of paper, polymeric film, silicon wafer, ceramic, metal, biological substrates, and composites thereof.

40. The method of claim 32, wherein the printhead is on board an off axis printer, and the ink-jet ink composition is fed to the printhead from replaceable ink cartridges through tubes.

41. The method of claim 32, wherein the increased slewing decap time is at least 10% greater than an otherwise identical ink-jet ink prepared without the presence of said surfactant.

\* \* \* \* \*

UNITED STATES PATENT AND TRADEMARK OFFICE
CERTIFICATE OF CORRECTION

PATENT NO. : 7,666,255 B2  Page 1 of 1
APPLICATION NO. : 11/076223
DATED : February 23, 2010
INVENTOR(S) : Hiang P Lauw et al.

It is certified that error appears in the above-identified patent and that said Letters Patent is hereby corrected as shown below:

In column 5, line 28, delete "napthyl," and insert -- naphthyl, --, therefor.

In column 15, line 54, in Claim 7, delete "napthyl," and insert -- naphthyl, --, therefor.

In column 17, line 17, in Claim 23, delete "napthyl," and insert -- naphthyl, --, therefor.

In column 18, line 64, in Claim 35, delete "napthyl," and insert -- naphthyl, --, therefor.

In column 20, line 2, in Claim 40, delete "off axis" and insert -- off-axis --, therefor.

Signed and Sealed this

Fifteenth Day of June, 2010

David J. Kappos
*Director of the United States Patent and Trademark Office*